US008862783B2

(12) United States Patent
Yadlon et al.

(10) Patent No.: US 8,862,783 B2
(45) Date of Patent: Oct. 14, 2014

(54) METHODS AND SYSTEM TO OFFLOAD DATA PROCESSING TASKS

(75) Inventors: Catherine A. Yadlon, Townsend, MA (US); Neil T. Hentschel, North Andover, MA (US); Brittain S. McKinley, Groton, MA (US)

(73) Assignee: Broadbus Technologies, Inc., Boxborough, MA (US)

( * ) Notice: Subject to any disclaimer, the term of this patent is extended or adjusted under 35 U.S.C. 154(b) by 2621 days.

(21) Appl. No.: 11/258,524

(22) Filed: Oct. 25, 2005

(65) Prior Publication Data

US 2007/0115983 A1    May 24, 2007

(51) Int. Cl.
| G06F 15/16 | (2006.01) |
| G06F 15/173 | (2006.01) |
| G06F 13/28 | (2006.01) |
| H04L 29/08 | (2006.01) |
| H04L 12/861 | (2013.01) |
| G06F 9/48 | (2006.01) |

(52) U.S. Cl.
CPC ............. H04L 67/06 (2013.01); H04L 49/90 (2013.01); H04L 67/1097 (2013.01); G06F 9/4843 (2013.01)
USPC ............................. 709/250; 709/238; 710/22

(58) Field of Classification Search
USPC .................... 709/238, 250; 710/22
See application file for complete search history.

(56) References Cited

U.S. PATENT DOCUMENTS 6,094,715 A * 7/2000 Wilkinson et al. ............ 712/20
6,427,173 B1 * 7/2002 Boucher et al. ............ 709/238
2001/0037406 A1 * 11/2001 Philbrick et al. ............ 709/250
2002/0091844 A1 * 7/2002 Craft et al. .................. 709/230
2004/0044744 A1 * 3/2004 Grosner et al. ............. 709/217
2004/0062275 A1   4/2004 Siddabathuni
2005/0060476 A1   3/2005 Tamura et al.
2005/0147126 A1   7/2005 Qiu et al.

FOREIGN PATENT DOCUMENTS

WO    WO 99/22306 A    5/1999

OTHER PUBLICATIONS

EPC Extended Search Report, RE: Application #06022354.2-2122 Feb. 20, 2007.
Summons to Oral Proceedings, RE: Application #06022354.2-2212 / 1780976 May 29, 2009.
Harvey, et al, "DMA Fundamentals on Various PC Platforms" (whole article) Apr. 1991.

* cited by examiner

Primary Examiner — Ranodhi Serrao
(74) Attorney, Agent, or Firm — Stewart M. Wiener

(57) ABSTRACT

Via use of a shared data bus, a processor system offloads processing tasks. For example, a processor system communicates over a respective data bus with a data communication controller. After notifying the data communication controller of a particular block of data to retrieve, the processor system relinquishes control of the respective data bus so that the data communication controller can control the data bus and store a block of data in a specified memory location using direct memory access techniques. Upon receiving a notification of completion of storing the data block by the data communication controller, the processor system regains control of the respective data bus and notifies a data forwarding circuit to: i) partition the block of data into data packets, ii) apply respective headers to the data packets based on the header information received from the processor system, and iii) forward the data packets to the respective destination.

13 Claims, 6 Drawing Sheets

METHODS AND SYSTEM TO OFFLOAD DATA PROCESSING TASKS

RELATED APPLICATION

This application is related to co-pending U.S. patent application Ser. No. 11/258,309, entitled "METHODS AND SYSTEM TO MANAGE DATA TRAFFIC," filed on an even date herewith, the entire teachings of which are incorporated herein by this reference.

BACKGROUND

Recent advancements in technology have made it possible to efficiently transfer large blocks of data over a network from a source to a destination. For example, conventional techniques typically include a processor device at the source location that parses a given block of data into smaller data packets, applies headers to the data packets, and forwards the data packets over the network to the appropriate destination. A respective processor at the destination location strips off the headers in the data packets and recombines data payload information retrieved from the data packets to reproduce the original block of data.

One purpose of including the header information in a data packet is to keep track of a respective data payload associated with a data packet. Upon receipt of a data packet at a destination, a corresponding processor checks the respective header information of the data packet to identify the contents of the respective data payload such as which part of a larger block of data the data payload pertains.

SUMMARY

There are deficiencies associated with conventional techniques of forwarding blocks of data to respective destinations. For example, generation of data packets as discussed above typically requires a processor to perform tasks of parsing a respective block of data and applying header information to each data packet. In other words, a processor has to retrieve a portion of a block of data stored in memory, generate a header for the portion of the block of data, and create a respective data packet using the data portion and the header. Thus, the processor locally performs tasks of generating data packets. Unfortunately, local generation of data packets by a single processor limits a rate of generating and forwarding data packets to a destination.

One solution for speeding up a process of generating data packets is to employ redundant resources. For example, instead of employing a single processor to generate data packets, a system can include multiple processor devices that generate data packets in parallel. The downside of such a topology is complexity, cost, and size. For example, implementation of multiple processors to perform a common operation can be complex and expensive as well as increase the size of respective circuit boards that generate the data packets from a given block of data.

The following disclosure includes several useful embodiments for offloading a processing task such as generation of data packets. According to a general embodiment herein, a processor system communicates over a respective data bus with a fiber channel controller. After notifying the fiber channel controller of a particular block of data to retrieve from a repository, the processor system relinquishes control of the respective data bus so that the fiber channel controller can control the data bus and store a retrieved block of data in a specified memory location using direct memory access techniques. Upon completion of storing the block of data in memory, the fiber channel relinquishes control of the data bus. The processor system regains control of the respective data bus and notifies a data forwarding circuit to process and forward the block of data (in the specified memory location) to the respective destination. Accordingly, a processor system herein can initiate forwarding blocks of data with minimal involvement.

More specifically, according to one embodiment, based on receiving a command for delivery of data to a respective destination, a processor system initiates a first remote process at a data communication controller (e.g., a fiber channel controller) to retrieve and store a block of data in a specified memory using direct memory access techniques. In one embodiment, after the processor system sends a message to the data communication controller over a respective data bus to initiate retrieval of the block of data, the processor system relinquishes control of the respective data bus to enable the data communication controller to utilize the respective data bus and store the block of data in the specified memory location. The processor system utilizes the respective data bus (previously used by the data communication controller to store the retrieved block of data) to notify the data forwarding circuit of the header information and initiate parsing and forwarding of the stored blocks of data. That is, after a respective transfer of the block of data from the data communication controller to the specified memory location, the processor system then notifies a second remote process at a data forwarding circuit of header information as well as the location where the block of data resides in memory. In one embodiment, the data forwarding circuit: i) partitions the block of data into data packets, ii) applies respective headers to the data packets based on the header information received from the processor system, and iii) forwards the data packets to the respective destination.

Upon completion of generating and forwarding the data packets, the processor system receives a notification from the data forwarding circuit regarding completion of forwarding the data packets to the respective destination and that the second remote process is available for parsing and forwarding another block of data. In one embodiment, the processor system maintains status information indicating when the data block is stored in the specified memory location. Upon receiving a notification from the data forwarding circuit indicating that the data forwarding circuit completed forwarding of the block of data to the appropriate destination via transmission of the respective data packets, the processor system updates its respective status information to reflect that the block of data was forwarded in the data packets to the respective destination. Consequently, the processor system can command the data communication controller to retrieve another block of data and store it in the respective "freed" memory space where the old block of data was previously stored and forward information to the same or different destination.

In further embodiments, the processor system prompts the data forwarding circuit to create different respective headers for applying to the data packets based on the header information such that each successive data packet forwarded to the respective destination includes a common portion of header information used in all of the data packets associated with the block of data as well as a unique portion of header information differentiating the data packets amongst each other. The common portion of header information can indicate that a respective data packet includes data associated with a respective block of data and the unique portion of header information can indicate a relative location of where data in the respective data payload in the data packet has been retrieved from the block of data. Consequently, according to one embodiment, the processor system can forward "seed" header information (to a remote process) that uses the seed header information to generate successive unique headers for the data packets rather than generate and forward each unique header to the data forwarding circuit.

Techniques herein are well suited for use in applications such as communication systems that parse and forward blocks of data as discussed herein. However, it should be noted that configurations herein are not limited to use in such applications and thus configurations herein and deviations thereof are well suited for other applications as well.

Embodiments herein can be implemented in hardware, software, or a combination of both. In one embodiment, the present disclosure includes a platform such as a computerized device (e.g., a computer processor system, a host computer, personal computer, workstation, power PC, etc.) configured to support the aforementioned techniques of offloading generation and forwarding of data packets to a remote destination. In such embodiments, the computerized device includes a memory system, a processor (e.g., a processing device), and a respective interconnect. The interconnect couples the processor to the memory system. The memory system is encoded with an application (e.g., software code) that, when executed on the processor, produces a process for offloading generation of data packets.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to offload generation and forwarding of data packets as explained herein. The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or an Field Programmable Gate Array (FPGA) or as downloadable software images in one or more modules, shared libraries, etc. The software or firmware or other such configurations can be installed onto a computerized device to cause one or more processors in the computerized device to perform the techniques explained herein.

One more particular embodiment of the present disclosure is directed to a computer program product that includes a computer readable medium having instructions stored thereon for offloading tasks associated with a data communication system. The instructions, when carried out by a processor of a respective computer device, cause the processor to perform the steps of: i) receiving a command for delivery of data to a respective destination; ii) in response to receiving the command, transmitting a message to initiate execution of a first remote process that retrieves a block of the data and stores the block of data in a memory location specified in the message; and iii) forwarding seed header information as well as the memory location specified in the message to a second remote process that: a) partitions the block of data into data packets, b) applies respective headers to the data packets based on the header information, and c) forwards the data packets to the respective destination. Other embodiments of the present application include software programs to perform any of the method embodiment steps and operations summarized above and disclosed in detail below.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

According to one embodiment, via use of a shared data bus, a processor system offloads a processing task such as generation and forwarding of data packets. For example, the processor system communicates over a respective data bus with a fiber channel controller. After notifying the fiber channel controller of a particular block of data to retrieve, the processor system relinquishes control of the respective data bus so that the fiber channel controller can control the data bus and store a block of data in a specified memory location using direct memory access techniques. Upon completion of storing the block of data in the specified memory location based on a corresponding notification from the fiber channel controller, the processor system regains control of the respective data bus and notifies a data forwarding circuit to: i) partition the block of data into data packets, ii) apply respective headers to the data packets based on the header information received from the processor system, and iii) forward the data packets to a respective destination.

Figure 1:
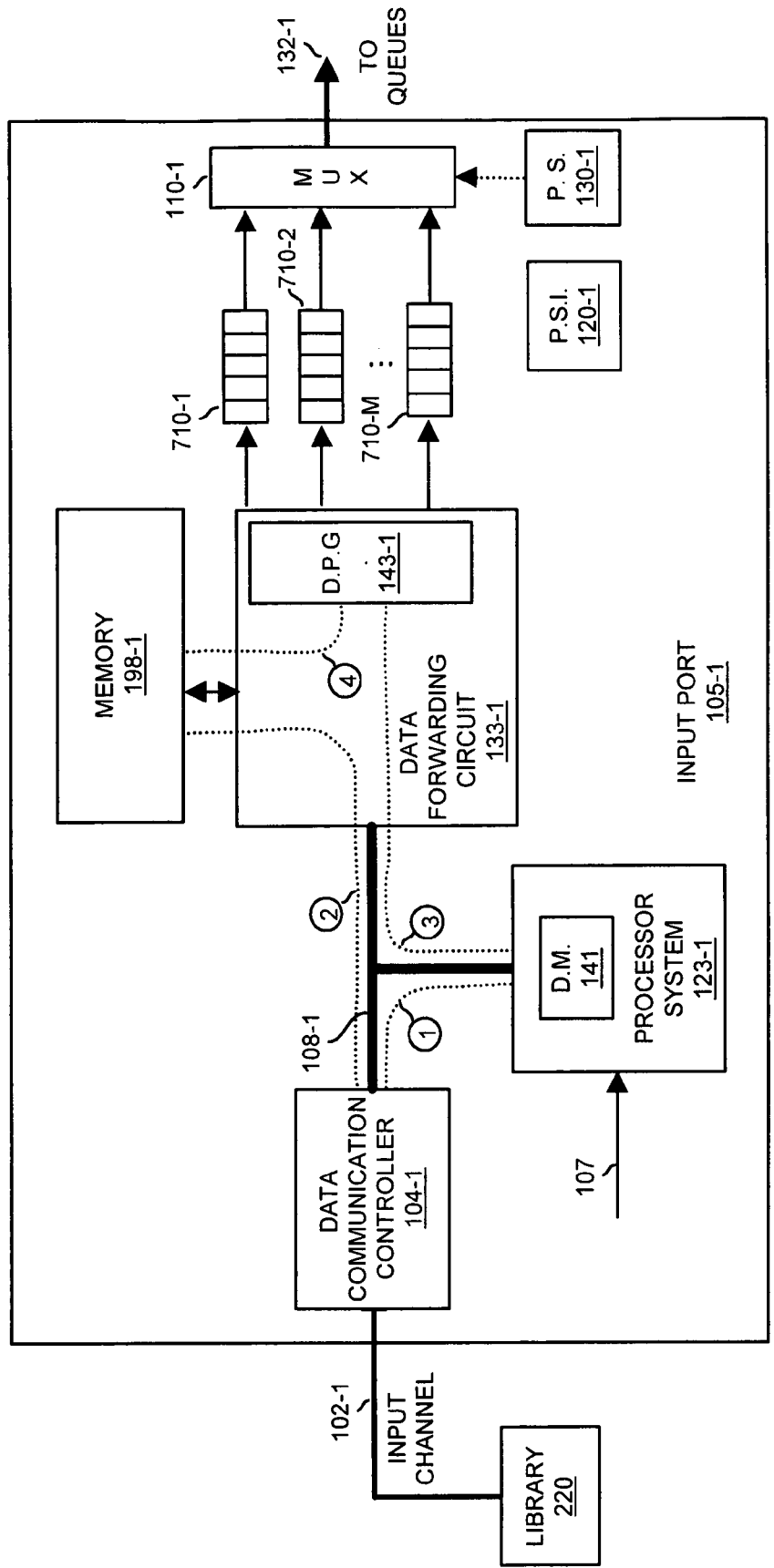
FIG. 1 is a block diagram of an input port according to an embodiment herein.

FIG. 1 is a block diagram of an input port 105-1 that receives data over input channel 102-1 and outputs the data as data packets from output channel 132-1 according to an embodiment herein. In general, input port 105-1 is one of multiple input ports that receives and forwards data to each of multiple queues. The multiple queues feed the data packets to one of multiple destinations that, in turn, store and eventually stream the blocks of data to subscribers as digitally encoded movies. An example illustrating further use of input port 105-1 is shown in the context of data communication system 150-1 of related U.S. patent application Ser. No. 11/258,309, entitled "METHODS AND SYSTEM TO MANAGE DATA TRAFFIC," which has been incorporated herein by reference.

As shown, input port 105-1 includes data communication controller 104-1, processor system 123-1 (e.g., a power PC), data bus 108-1 (e.g., a 64 bit PCI bus operating at 66 megahertz), data forwarding circuit 133-1, memory 198-1, slot 710-1, slot 710-2, . . . , slot 710-M (collectively, slots 710 such as buffers or queues), multiplexer 110-1, port scheduler 130-1, and port status information 120-1. Processor system 123-1 includes data manager 141. Data forwarding circuit 133-1 includes data packet generator 143-1.

According to one embodiment, based on receiving the request 107 (e.g., command) for delivery of data to a respective destination such as one of multiple queues accessible via output channel 132-1, data manager 141 of processor system 123-1 initiates a first remote process such as data communication controller 104-1 (e.g., a fiber channel controller) to retrieve and store a block of data in a specified location of memory 198-1 using direct memory access techniques. In one embodiment, the processor system 123-1 provides the data communication controller 104-1 of a PCI address for storing the data block in memory 198-1. The request 107 can be for a large segment of data (e.g., 8 megabytes) that is broken up by the processor system 123-1 into multiple sub-requests for respective blocks of data in the segment.

After the processor system 123-1 communicates a message to the data communication controller 104-1 (e.g., over data bus 108-1), which initiates retrieval of the requested block of data in step 1, the processor system 123-1 relinquishes control of the respective data bus 108-1.

In step 2, the data communication controller 104-1 then gains control of the data bus 108-1 and stores (e.g., using direct memory access techniques) a specified block of data retrieved from the library 220 in the specified location of memory 198-1. Thus, according to one embodiment, the data bus 108-1 serves a dual purpose. For example, the processor system 123-1 utilizes the respective data bus 108-1 to notify the data communication controller 104-1 (e.g., a first remote process over the data bus 108-1) to retrieve and thereafter store a specified block of data in memory 198-1. The data communication controller 104-1 uses the data bus 108-1 to access (e.g., store the data block) memory 198-1.

After a respective retrieval and transfer of the block of data from the data communication controller 104-1 to a location in memory 198-1 as specified by the processor system 123-1 in step 2, the data communication controller relinquishes control of the data bus 108-1.

In step 3, the processor system 123-1 regains control of the data bus 108-1 and (via the data bus 108-1 or some other communication link) then notifies data forwarding circuit 133-1 of "seed" header information for generating respective data packets associated with the stored block of data. The processor system 123-1 also notifies the data forwarding circuit 133-1 of the location in memory 198-1 where the block of data resides. Thus, in one embodiment, the processor system 123-1 notifies the data forwarding circuit 133-1 (e.g., a second remote process over the data bus 108-1) of the header information and initiates parsing and forwarding of the blocks of data. In one embodiment, the seed header information is not a respective header to be applied to respective data packets but is instead information indicating how to generate different headers for each of the generated data packets.

In step 4, the data forwarding circuit 133-1 and, more particularly, data packet generator 143-1 supports: i) partitioning of the block of data into data packets, ii) applying respective headers to the data packets based on the seed header information received from the processor system 123-1, and iii) forwarding of the data packets to a respective slot 710. Multiplexer 110-1 forwards the data packets (temporarily stored in slots 710) over output channel 132-1 to one of multiple queues. The queues forward the data packets to an appropriate destination.

Upon completion of generating and forwarding the data packets in step 4, the processor system 123-1 receives a notification from the data forwarding circuit 133-1 regarding completion of forwarding the data packets to the respective destination (as previously indicated by the processor system 123-1) and that the data forwarding circuit 133-1 or, more particularly, data packet generator 143-1 is available for parsing and forwarding another block of data.

In one embodiment, the block of data stored in memory 198-1 can be 384 kilobytes in size. The data packet generator 143-1 produces respective data packets; each generated data packet includes 1024 bytes of data from the respective block of data being forwarded to an appropriate destination. Thus, a single block of data can be partitioned into a group including many data packets by the data forwarding circuit 133-1.

As discussed above, the processor system 123-1 can control the data communication controller 104-1 to store retrieved data in memory 198-1 and thereafter control data forwarding circuit 133-1, which generates data packets from the one or more stored blocks of data in memory 198-1. In one embodiment, the processor system 123-1 maintains status information for managing both the data communication controller 104-1 and data forwarding circuit 133-1 for orchestrating a movement of data from the input channel 102-1 to the output channel 132-1. One purpose of the status information is to keep track of used and unused portions of memory 198-1 so that the processor system 123-1 can more efficiently control the data communication controller 104-1 and the data forwarding circuit 133-1 and avoid loss of data and/or staleness of data in memory 198-1.

Upon receiving a notification from the data forwarding circuit 133-1 indicating that the data forwarding circuit 133-1 completed forwarding of the block of data to the respective destination via transmission of the data packets generated by data packet generator 143-1, the processor system 123-1 updates its respective status information to reflect that the block of data was forwarded to an appropriate destination through output channel 132-1. Consequently, according to an embodiment herein, the processor system 123-1 can then command the data communication controller 104-1 to retrieve another block of data and store the newly retrieved block of data in the respective "freed" memory space where the old block of data was previously stored. The newly stored block of data can be stored and forwarded to the same or different destination as the last block of data.

In one embodiment, processor system 123-1 receives a request 107 identifying an 8 megabyte chunk of a respective digitally encoded movie that is forwarded to a respective destination through a selected one of multiple queues. A typical movie can be encoded in 2-3 Gigabytes and stored in library 220. The processor system 123-1 breaks down the 8 megabyte request 107 into 24 smaller sequential requests for respective blocks of data (e.g., 384 kilobyte blocks) associated with the digitally encoded movie. As discussed above, the data packet generator 143-1 in the data forwarding circuit 133-1 forwards a respective block of data stored in memory 198-1 as successive 1024 byte data packets.

Figure 2:
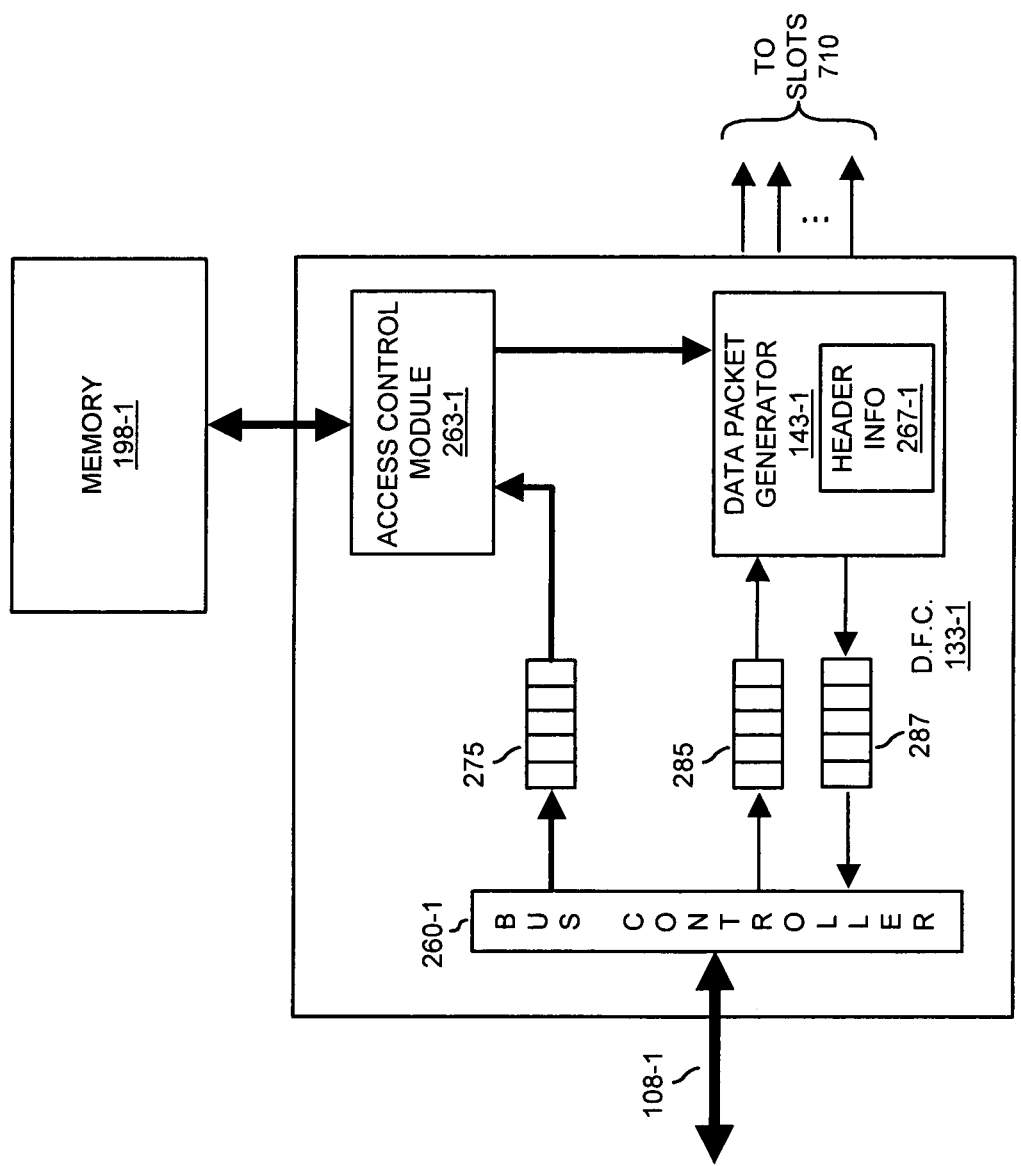
FIG. 2 is a detailed block diagram of a data forwarding circuit according to an embodiment herein.

FIG. 2 is a block diagram of a data forwarding circuit 133-1 according to an embodiment herein. As shown, data forwarding circuit 133-1 includes bus controller 260-1, buffer 275 (e.g., a FIFO device), buffer 285, buffer 287, access control module 263-1, and data packet generator 143-1. Data packet generator 143-1 utilizes "seed" header information 267-1 received from processor system 123-1 to create successive data packets from a given block of data stored in memory 198-1.

More particularly, data forwarding circuit 133-1 includes a bus controller 260-1 to facilitate bi-directional transfers of data with respect to data forwarding circuit 133-1 over data bus 108-1. For example, according to an inbound direction, data communication controller 104-1 performs direct memory accesses over data bus 108-1 to store data in memory 198-1. During such a process, data forwarding circuit 133-1 can temporarily store received data in buffer 275 (e.g., a FIFO device). Access control module 263-1 facilitates storage of the data in buffer 275 into the appropriate location of memory 198-1. Also in the inbound direction from processor system 123-1 to data forwarding circuit 133-1, buffer 285 stores information such as processing commands received from processor system 123-1.

In an outbound direction from bus controller 260-1, data forwarding circuit 133-1 notifies processor system 123-1 of a processing status (e.g., a completion message) associated with generation of respective data packets for a given data block stored in memory 198-1. For example, data packet generator 143-1 stores messages or information in buffer 287 for retrieval by processor system 123-1.

When the data communication controller 104-1 completes a respective memory transfer over data bus 108-1 and storage of a data block in memory 198-1, the processor system 123-1 informs data packet generator 143-1 of data forwarding circuit 133-1 that a respective data block is available for parsing and forwarding. For example, processor system 123-1 initiates writing of information to buffer 285 to inform data packet generator 143-1 of instructions to generate data packets based on a stored block of data in memory 198-1. In addition to providing an address identifying a location (in memory 198-1) of a stored block of data to be processed, the processor system 123-1 also provides the data packet generator 143-1 routing header information (e.g., seed header information 267-1) associated with a respective block of data. In the context of one embodiment, the data packet generator 143-1 of the data forwarding circuit 133-1 segments the block of data into 1024 byte packets, concatenates the header (modifying fields as necessary), and then forwards the packet to the slots 710 for further transmission to a destination in a respective data communication system.

As mentioned, when an entire block of data stored in memory 198-1 has been segmented into 1024 byte packets and forwarded by data packet generator 143-1, the data forwarding circuit 133-1 informs the processor system 123-1 (via writing to outbound buffer 287) that a respective data transfer has been completed and the corresponding freed memory space is now available for another segment of data.

As discussed, the processor system 123-1 orchestrates what data is stored in memory 198-1 and schedules when data packet generator 143-1 is to generate respective data packets for a block of data stored in memory 198-1. In the embodiment as shown, the processor system 123-1 externally manages memory 198-1 as if it were a local process having direct access to memory 198-1. In such an example embodiment, the processor system 123-1 has indirect access to memory 198-1 through the data forwarding circuit 133-1.

As mentioned, the processor system 123-1 maintains status information indicating whether memory 198-1 is full/empty and what portions of memory 198-1 store respective data blocks. Accordingly, the data forwarding circuit 133-1 does not need to have knowledge of this status information other than in the form of commands that have been relayed from processor system 123-1 indicating which blocks of data in memory 198-1 will be processed next to create respective data packets.

In the example embodiment shown in FIG. 2, the processor system 123-1 writes data to buffer 285 (e.g., a FIFO device) to inform the data forwarding circuit 133-1 when a respective data block stored in memory 198-1 is available for parsing and forwarding. The data packet generator 143-1 reads the information in buffer 285 to learn of commands issued by the processor system 123-1 to parse and forward a respective block of data to a destination.

In the context of one embodiment, an entry in buffer 285 includes information such as a starting address value (e.g., a PCI bus address identifying a location of a respective block of data in memory 198-1), a length value, and/or respective header information 267-1 to be used when generating and forwarding respective data packets. The data packet generator 143-1 uses the information in a respective entry of buffer 285 to determine which of multiple blocks of data will be processed next. For example, buffer 285 is a FIFO of entries identifying an ordering of how blocks of data in memory 198-1 will be processed and forwarded by the data packet generator 143-1. The data packet generator 143-1 can include multiple processing threads to simultaneously generate data packets for multiple respective blocks of data.

The data packet generator 143-1 provides feedback to the processor system 123-1 via writes to buffer 287 (e.g., a FIFO device). The feedback stored in buffer 287 indicates when the data packet generator 143-1 has retrieved, parsed, and forwarded a respective data block stored in memory 198-1. For example, according to one embodiment, the information associated with an entry in buffer 287 indicates the corresponding starting address value and buffer length value associated with a respective data block was just forwarded by data packet generator 143-1.

Each of buffer 285 and buffer 287 can be large enough to store up to 32 entries of information. Each entry corresponds to a block of data stored in memory 198-1. Use of buffer 285 and buffer 287 relaxes timing requirements associated with communications between the data forwarding circuit 133-1 and the processor system 123-1.

The data forwarding circuit 133-1 can generate additional signals to indicate different events to the processor system 123-1. For example, the processor system 123-1 can issue an "almost full" interrupt back to processor system 123-1 to indicate to the processor system 123-1 that buffer 285 is almost full and in danger of being overfilled. A packet counter is also available to more specifically identify a fullness associated with the buffer 287. In the context of one embodiment, the data forwarding circuit 133-1 generates an "overflow" interrupt to the processor system 123-1 when the processor system 123-1 writes to a full buffer 285. If an overflow occurs, a respective entry of information will be dropped.

The data forwarding circuit 133-1 generates a respective interrupt to indicate to processor system 123-1 that a transfer of a block of data stored in memory 198-1 has been completed. A packet counter is also available. The data forwarding circuit 133-1 generates an "underflow" interrupt when the processor system 123-1 reads from an empty buffer 287.

An "overflow" interrupt occurs if the data packet generator 143-1 writes to a full buffer 287. If such an overflow occurs, the respective entry will be dropped. The processor system 123-1 has the responsibility of continuously reading entries in the buffer 287 make ensure that the data packet generator 143-1 doesn't write to a full buffer 287.

In the context of one example embodiment, memory 198-1 comprises 32 megabytes of SDRAM (Synchronous Dynamic Random Access Memory) dynamically segmented into "blocks" depending on how processor system 123-1 sizes each of the blocks of data stored in memory 198-1. Auto-refresh of the SDRAMs occurs at least every 15.625 microseconds. A minimum respective block size for storing data is 1024 bytes and the maximum respective block size for storing data in memory 198-1 is 8 megabytes. As discussed, each of buffer 285 and buffer 287 stores up to 32 entries of information associated with respective blocks stored in memory 198-1. Up to 32 blocks of data can be stored in memory 198-1 at the same time.

Access control module 263-1 can include a physical interface such as a 64 bit data bus operating at a rate of 100 megahertz. The access control module 263-1 supports arbitration so that the data communication controller 104-1 can store new blocks of data in buffer 275 while data packet generator 143-1 retrieves blocks of data for parsing and forwarding. Buffer 275 can be an intermediate FIFO that temporarily stores data received over data bus 108-1 while data packet generator 143-1 retrieves a data block or portion thereof from memory 198-1. When the data bus for accessing memory 198-1 is free, access control module 263-1 reads the data and stores it in memory 198-1. A maximum rate of forwarding data packets from a combination of all slots 710 is 1.52 gigabits per second.

To meet the above requirements of arbitrating between storing data from data communication controller 104-1 and retrieving data for data packet generator 143-1, access control module 263-1 employs a time-slotted arbitration scheme. For example, a sequence of the time slot arbitration enables 2 writes (to memory 198-1), 1 read (from memory 198-1), 2 writes, 1 reads, 2 writes, 1 reads, 2 writes, and 1 refresh. This sequence of time slots repeats over time. In one embodiment, each read and write is 1024 bytes, has a CAS latency of 3, burst length of 8, is of a sequential burst type, and includes an auto-precharge.

As previously discussed, the processor system 123-1 prompts the data forwarding circuit 133-1 to create different respective headers for applying to a group of related data packets based on the header information 267-1 such that each successive data packet (in a group of data packets derived from the same block of data) forwarded to the respective destination includes a common portion of header information used in all of the data packets associated with the block of data as well as a unique portion of header information differentiating the data packets amongst each other for the block of data. The common portion of header information indicates that a respective data packet includes data associated with the block of data and the unique portion of header information indicates a relative location of where data in the respective data payload in the data packet has been retrieved from the block of data. Consequently, according to one embodiment, the processor system can forward "seed" header information that is used to generate successive unique headers for the data packets rather than generate and forward each unique header to the data forwarding circuit 133-1.

In one embodiment, the "seed" header information 267-1 associated with a particular block of data stored in memory 198-1 includes slot information identifying which of multiple slots 710 to forward respective data packets for a given block of data, a content identifier associated with the block of data, a data buffer address value identifying where a respective 8 megabyte segment of data (e.g., as specified by the request 107) resides in a given movie stream, and a data buffer offset value identifying where a respective block of data reside in the 8 megabyte segment of the given movie stream. Thus, for a given block of data (e.g., 384 kilobytes), the data packet generator 143-1 uses the same slot information, content identifier, and data buffer address value for respective headers associated with each of the generated data packets. However, the data buffer offset in the header of a respective data packet is different for each data packet generated from the given block of data.

Figure 3:
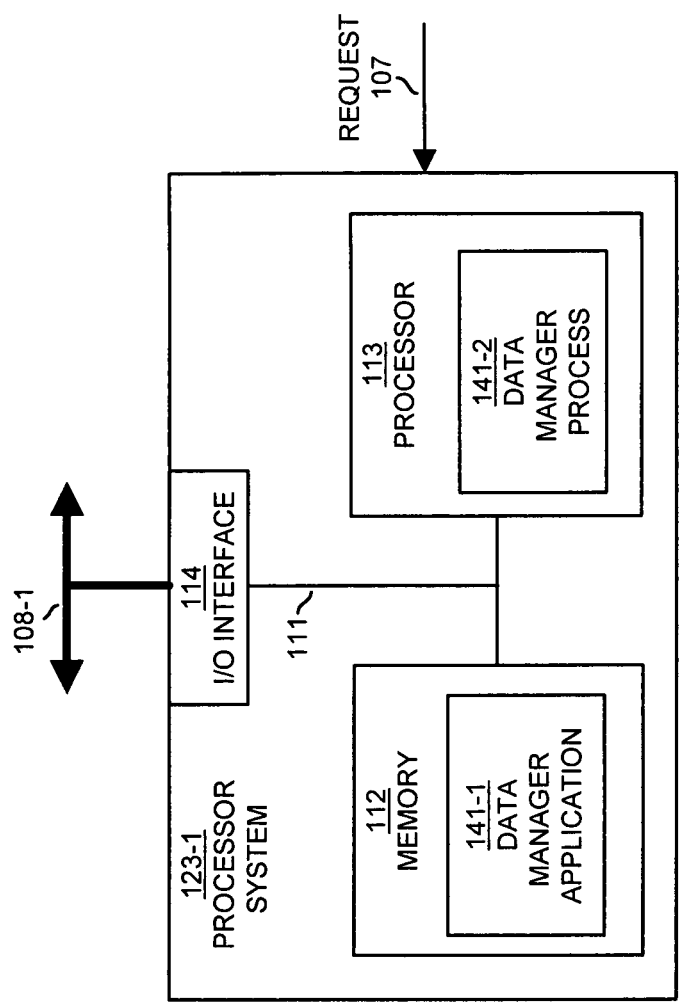
FIG. 3 is a block diagram of sample hardware and software for implementing data forwarding techniques according to an embodiment herein.

FIG. 3 is an example of a sample architecture for implementing a processor system 123-1 according to an embodiment herein. As shown, processor system 123-1 includes a processor 113 and corresponding software code (e.g., data manager application 141-1) to carry out the embodiments discussed in this specification. As an alternative to an embodiment as shown in FIG. 3, the processor system 123-1 can be implemented via any type of electronic hardware components such as logic gates, micro-controllers, buffers, memory, etc. such as those found in programmable gate array devices.

Referring now to the embodiment as shown in FIG. 3, processor system 123-1, of the present example includes an interconnect 111 that couples a memory system 112, the processor 113, and an input/output interface 114. According to one embodiment, interconnect 111 and are data bus 108-1 are the same data bus, which is used to communicate with data communication controller 104-1 and data forwarding circuit 133-1.

Memory 112 is encoded with data manager application 141-1. In general, data manager application 141-1 supports offloading tasks to remote sources such as data communication controller 104-1 and data forwarding circuit 133-1.

Data manager application 141-1 can be embodied as software code such as data and/or logic instructions (e.g., code stored in the memory or on another computer readable medium such as a disk) that support processing functionality according to different embodiments described herein. During operation, processor 113 accesses memory system 112 via the interconnect 111 in order to launch, run, execute, interpret or otherwise perform the logic instructions of the data manager application 1411. Execution of data manager application 141-1 produces processing functionality in data manager process 141-2. In other words, the data manager process 141-2 represents one or more portions of the data manager 141 (or the entire application 141-1) performing within or upon the processor 113 in the processor system 123-1.

It should be noted that the data manager 141 executed in processor system 123-1 is represented in FIG. 3 by either one or both of the data manager application 141-1 and/or the data manager process 141-2. For purposes of future discussions, general reference will be made to the data manager 141 or processor system 123-1 as performing or supporting the various steps and functional operations to carry out techniques discussed herein.

It should also be noted that example configurations herein include the data manager application 141-1 itself (i.e., the un-executed or non-performing logic instructions and/or data). The data manager application 141-1 can be stored on a computer readable medium (such as a floppy disk), hard disk, or optical medium. The data manager application 141-1 can also be stored in memory 112 such as in firmware, read only memory (ROM), or, as in this example, as executable code in, for example, Random Access Memory (RAM). In addition to these embodiments, it should also be noted that other embodiments herein include execution of data manager application 141-1 in processor 113 as the data manager process 141-2. Thus, those skilled in the art will understand that the data manager 141 herein can include other processes, software and/or hardware components to carry out functionality described herein.

Figure 4:
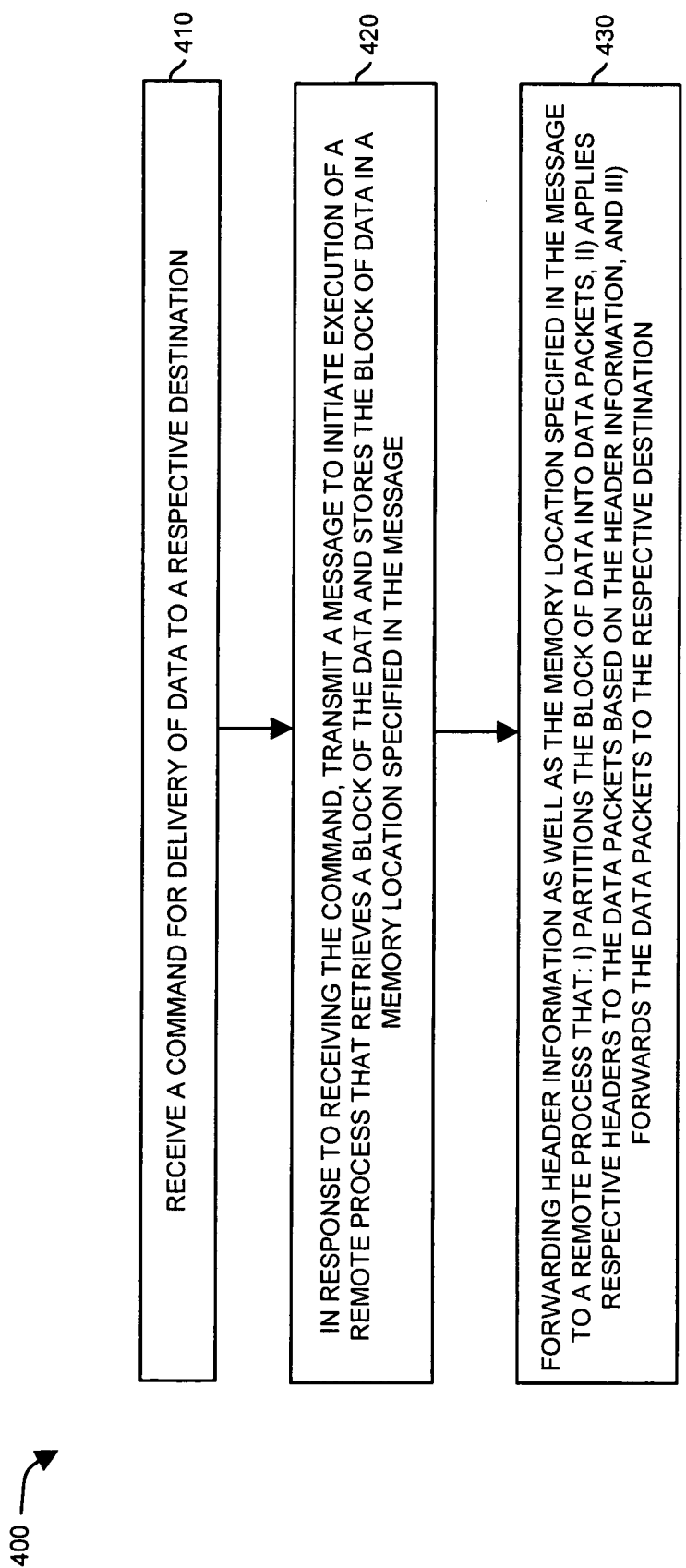
FIG. 4 is a flowchart illustrating a technique of offloading generation of data packets to a remote process according to an embodiment herein.

FIG. 4 is a flowchart 400 illustrating a technique of initiating remote generation of data packets according to an embodiment herein. FIG. 4 will be described with respect to components previously referenced in FIGS. 1-3. Thus, the following discussion will overlap with concepts and techniques discussed above. As mentioned, data manager 141 and/or processor system 123-1 can be implemented in hardware and/or software to carry out the techniques discussed herein.

In step 410, processor system 123-1 (e.g., data manager 141) receives a request 107 (e.g., a command) for delivery of data (e.g., a data block) retrieved from library 220 to a respective destination.

In step 420, in response to receiving the request 107, processor system 123-1 transmits a message to initiate data communication controller 104-1 (e.g., a remote process with respect to the processor system 123-1) to retrieve the block of data and store it in a memory location of memory 198-1 as specified in the message.

In step 430, processor system 123-1 forwards header information (e.g., a header "seed" associated with the block of data) as well as the memory location specified in the previous message to data forwarding circuit 133-1 (e.g., another remote process) that: i) partitions the block of data into data packets, ii) applies respective headers to the data packets based on the header information, and iii) forwards the data packets to the respective destination.

Figure 5:
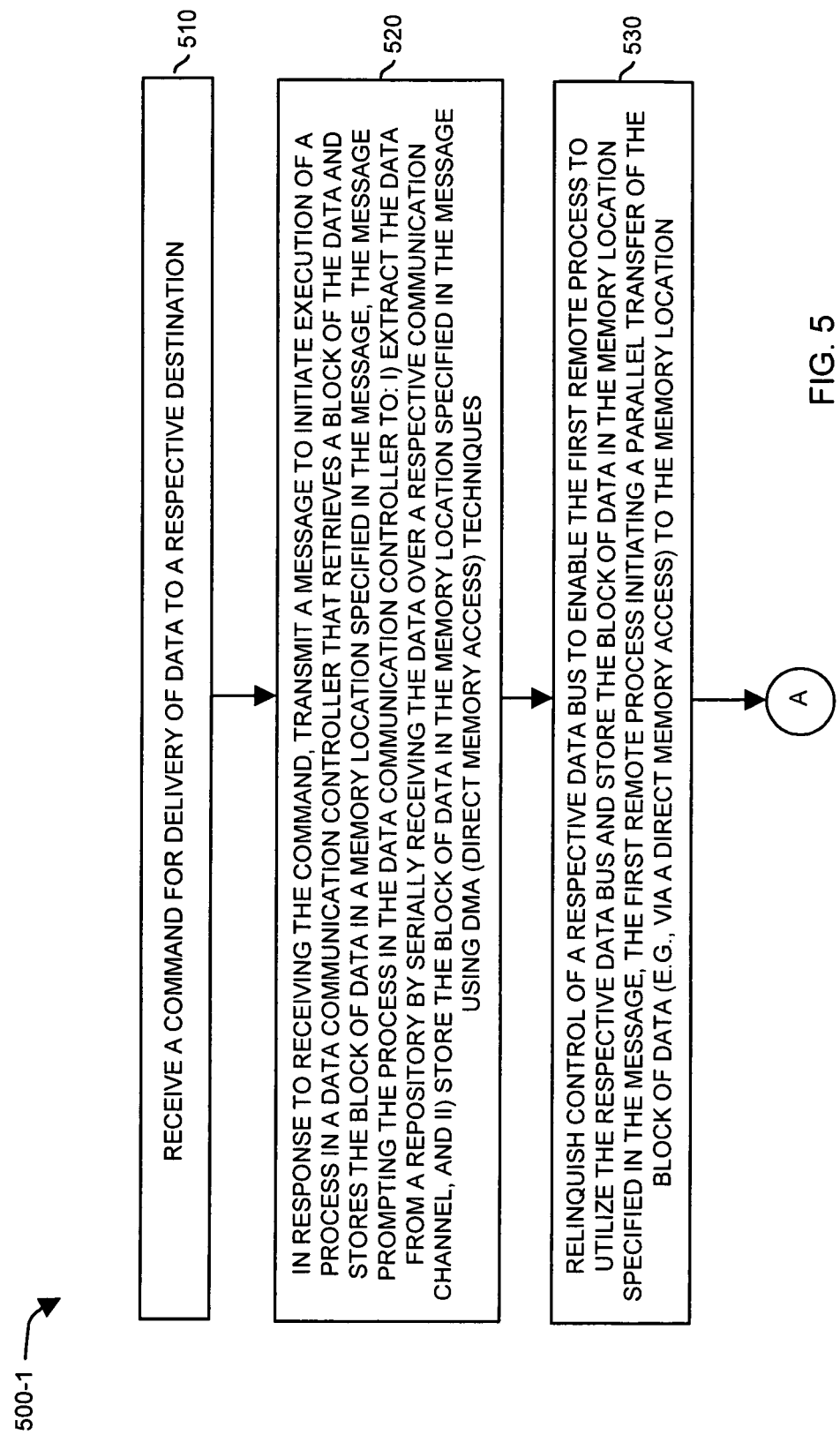
FIGS. 5 and 6 combine to form a flowchart illustrating more specific techniques of scheduling data flows according to an embodiment herein.
Figure 6:
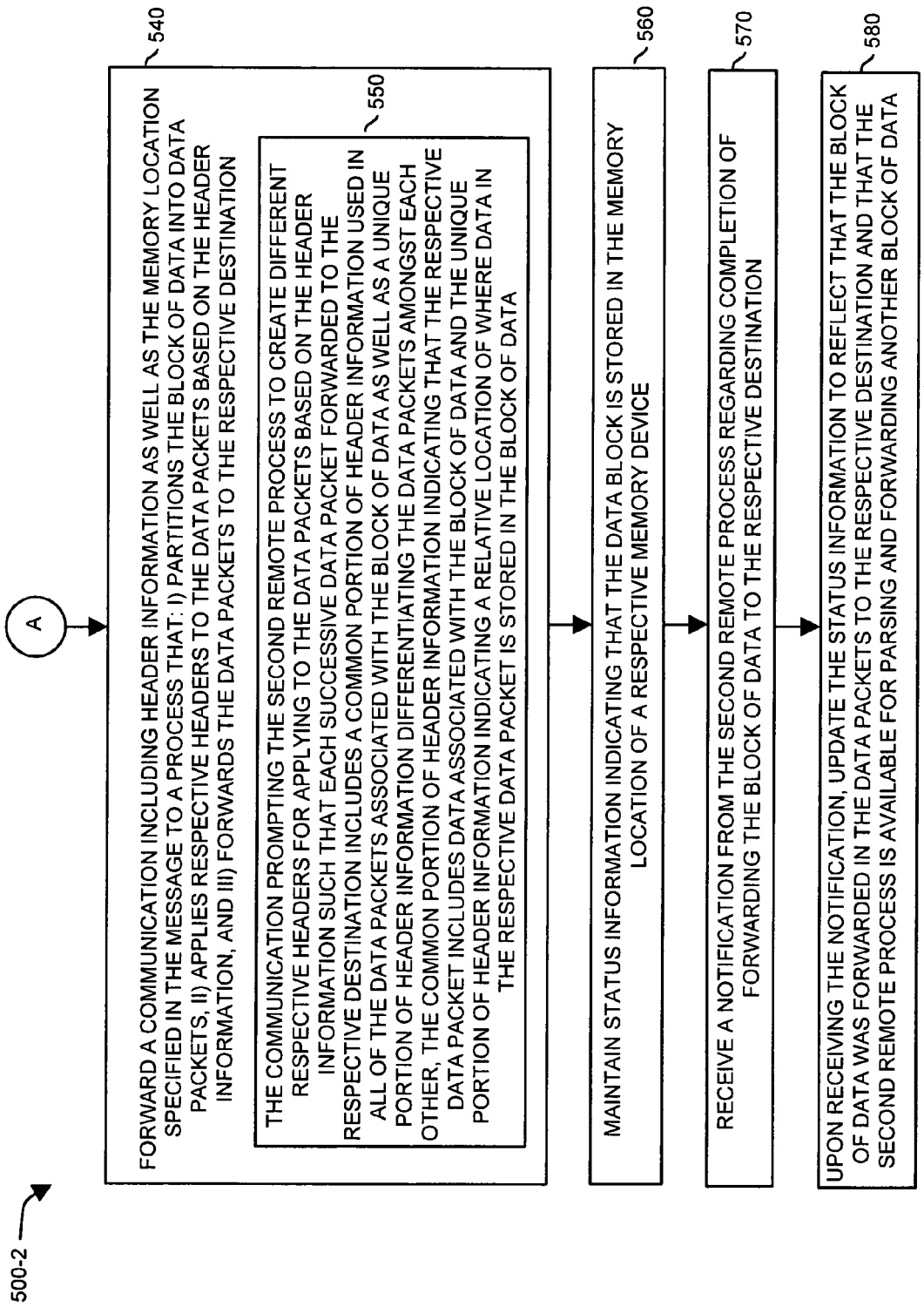

FIGS. 5 and 6 combine to form a flowchart 500 (e.g., a combination of flowchart 500-1 and flowchart 500-2) illustrating a more specific technique of offloading processing tasks according to an embodiment herein. Note that FIGS. 5 and 6 further describe some of the features and techniques previously described with respect to the embodiments in FIGS. 1-4. As mentioned, processor system 123-1 and respective functionality can be implemented in hardware and/or software.

In step 510 of flowchart 500-1 in FIG. 5, processor system 123-1 receives a command (e.g., request 107) for delivery of data in stored library 220 (or other data source) to a respective destination.

In step 520, in response to receiving the command, processor system 123-1 transmits a message to initiate (execution of a process in) data communication controller to retrieve a block of the data from library 220 and store the block of data in a memory location of memory 198-1 as specified in the message. Thus, the message from the processor system 123-1 to the data communication controller 104-1 prompts the data communication controller 104-1 to: i) extract the data from a repository (e.g., the library 220) by serially receiving the data over a respective input communication channel 102-1, and ii) store the block of data in the memory location specified in the message using direct memory access techniques over data bus 108-1.

In step 530, processor system 123-1 relinquishes control of a respective data bus 108-1 to enable the data communication controller 104-1 to utilize the data bus 108-1 and store the block of data to the specified memory location of memory 198-1. In one embodiment, the data communication controller 104-1 initiates a parallel transfer (e.g., via a 64 bit data bus operating at 66 megahertz) of the block of data (e.g., via a direct memory access) to the specified memory location of memory 198-1.

In step 540 of flowchart 500-2 in FIG. 6, the processor system 123-1 forwards a communication including header information as well as the memory location specifying where the block of data is stored in memory 198-1 to data forwarding circuit 133-1. In one embodiment, the processor system 123-1 forwards the communication to data forwarding circuit 133-1 using data bus 108-1. Following receipt of the communication, data forwarding circuit 133-1 partitions the block of data stored in memory 198-1 into data packets, applies respective headers to the data packets based on the header information, and forwards the data packets to a specified destination In sub-step 550 associated with step 540, the communication from the processor system 123-1 to data forwarding circuit 133-1 prompts the data forwarding circuit 133-1 (or process therein such as data packet generator 143-1) to create different respective headers for applying to the newly generated data packets such that each successive data packet forwarded to the respective destination includes a common portion of header information used in all of the data packets (created from the block of data) as well as a unique portion of header information differentiating the data packets amongst each other. The common portion of header information associated with the data packets indicates that the respective data in the data packets is associated with a particular block of data. The unique portion of header information indicates a relative location of where data in the respective data packet is stored in the block of data. Consequently, a device receiving the set of data packets can extract the data payload from the data packets and recreate the original block of data at the destination.

In step 560, processor system 123-1 maintains status information indicating that the data block has been stored in the specified location associated with memory 198-1.

In step 570, processor system 123-1 receives a notification from data forwarding circuit 133-1 regarding completion of forwarding the block of data to the respective destination. In other words, data forwarding circuit 133-1 (or more particularly data packet generator 143-1) stores the generated data packets to a respective slot 710 for forwarding to the destination.

In step 580, upon receiving the notification from data forwarding circuit 133-1, processor system 123-1 updates its status information to reflect that the block of data was forwarded in the data packets to the respective destination and that the data forwarding circuit 133-1 (or respective process therein) is available for parsing and forwarding another block of data.

As discussed, techniques herein are well suited for offloading generation of data packets to a remote process via use of a shared data bus. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for offloading a task of forwarding information, the method comprising steps of:
   receiving a command for delivery of data to a respective destination;
   in response to receiving the command, transmitting a message to initiate execution of a first remote process that retrieves a block of the data and stores the block of data in a memory location specified in the message;
   relinquishing control of a respective data bus to enable the first remote process to utilize the respective data bus and store the block of data in the memory location specified in the message, the first remote process initiating a parallel transfer of the block of data to the memory location, the memory location being accessible by a second remote process; and forwarding header information as well as the memory location specified in the message to the second remote process that: i) partitions the block of data into data packets, ii) applies respective headers to the data packets based on the header information, and iii) forwards the data packets to the respective destination.

2. A method as in claim 1, wherein transmitting the message prompts the first remote process residing in a data communication controller to:

extract the data from a repository by serially receiving the data over a respective communication channel; and store the block of data in the memory location specified in the message using DMA (Direct Memory Access) techniques.

3. A method as in claim 1, wherein forwarding header information as well as the memory location specified to the second remote process further includes prompting the second remote process to:

create different respective headers for applying to the data packets based on the header information such that each successive data packet forwarded to the respective destination includes a common portion of header information used in all of the data packets associated with the block of data as well as a unique portion of header information differentiating the data packets amongst each other.

4. A method as in claim 3, wherein the common portion of header information indicates that a respective data packet includes data associated with the block of data and the unique portion of header information indicates a relative location of where data in the respective data packet is stored in the block of data.

5. A method as in claim 1, wherein transmitting the message includes: i) notifying the first remote process of the memory location in which to store the block of data, and ii) notifying the first remote process of a respective source for retrieving the data.

6. A method as in claim 1 further comprising:

receiving a notification from the second remote process regarding completion of forwarding the data packets to the respective destination and that the second remote process is available for parsing and forwarding another block of data.

7. A method as in claim 1 further comprising:

maintaining status information indicating that the data block is stored in the memory location of a respective memory device;

receiving a notification from the second remote process regarding completion of forwarding the block of data to the respective destination via transmission of the data packets; and upon receiving the notification, updating the status information to reflect that the block of data was forwarded in the data packets to the respective destination.

8. A method as in claim 1, wherein initiating the parallel transfer of the block of data includes storing the block of data in the memory location based on use of a direct memory access to the memory location specified by the message.

9. A method as in claim 1, wherein transmitting the message includes communicating over a respective data bus with a controller that supports execution of the first remote process, the method further comprising: relinquishing control of the respective data bus to enable the first remote process to utilize the respective data bus and store the block of data in the memory location specified in the message, the first remote process initiating a transfer of the block of data to the memory location.

10. A method as in claim 9 further comprising:

upon receiving a notification that the first remote process completes the transfer of the block of data, regaining control of the respective data bus to communicate with a data packet generator circuit that resides at a remote location with respect to the controller and executes the second remote process.

11. A method as in claim 1, wherein transmitting the message includes communicating over a respective data bus with a controller that supports execution of the first remote process, the method further comprising:

relinquishing control of the respective data bus to enable the first remote process to utilize the respective data bus and store the block of data in the memory location specified in the message, the first remote process initiating, via a respective direct memory access, a parallel transfer of the block of data to the memory location;

regaining control of the respective data bus to perform reads from and writes to a data packet generator circuit that executes the second remote process.

12. A method as in claim 11, wherein forwarding the header information as well as the memory location specified by the message includes writing information via use of the respective data bus to a first data buffer associated with the data packet generator circuit, the method further comprising:

via use of the respective data bus, reading information from a second data buffer indicating that the data packet generator circuit forwarded the block of data to the destination; and updating locally maintained status information to indicate that the data packet generator circuit is available to assemble and forward data packets associated with another block of data to a respective destination.

13. A non-transitory computer-readable medium containing instructions which, when executed by one or more processors, performs a method for offloading a task of forwarding information, the method comprising:

receiving a command for delivery of data to a respective destination;

transmitting a message to initiate execution of a first remote process that retrieves a block of the data and stores the block of data in a memory location specified in the message in response to receiving the command;

relinquishing control of a respective data bus to enable the first remote process to utilize the respective data bus and store the block of data in the memory location specified in the message, the first remote process initiating a parallel transfer of the block of data to the memory location, the memory location being accessible by a second remote process; and forwarding header information as well as the memory location specified in the message to the second remote process that: i) partitions the block of data into data packets, ii) applies respective headers to the data packets based on the header information, and iii) forwards the data packets to the respective destination.

* * * * *